Patented Jan. 12, 1937

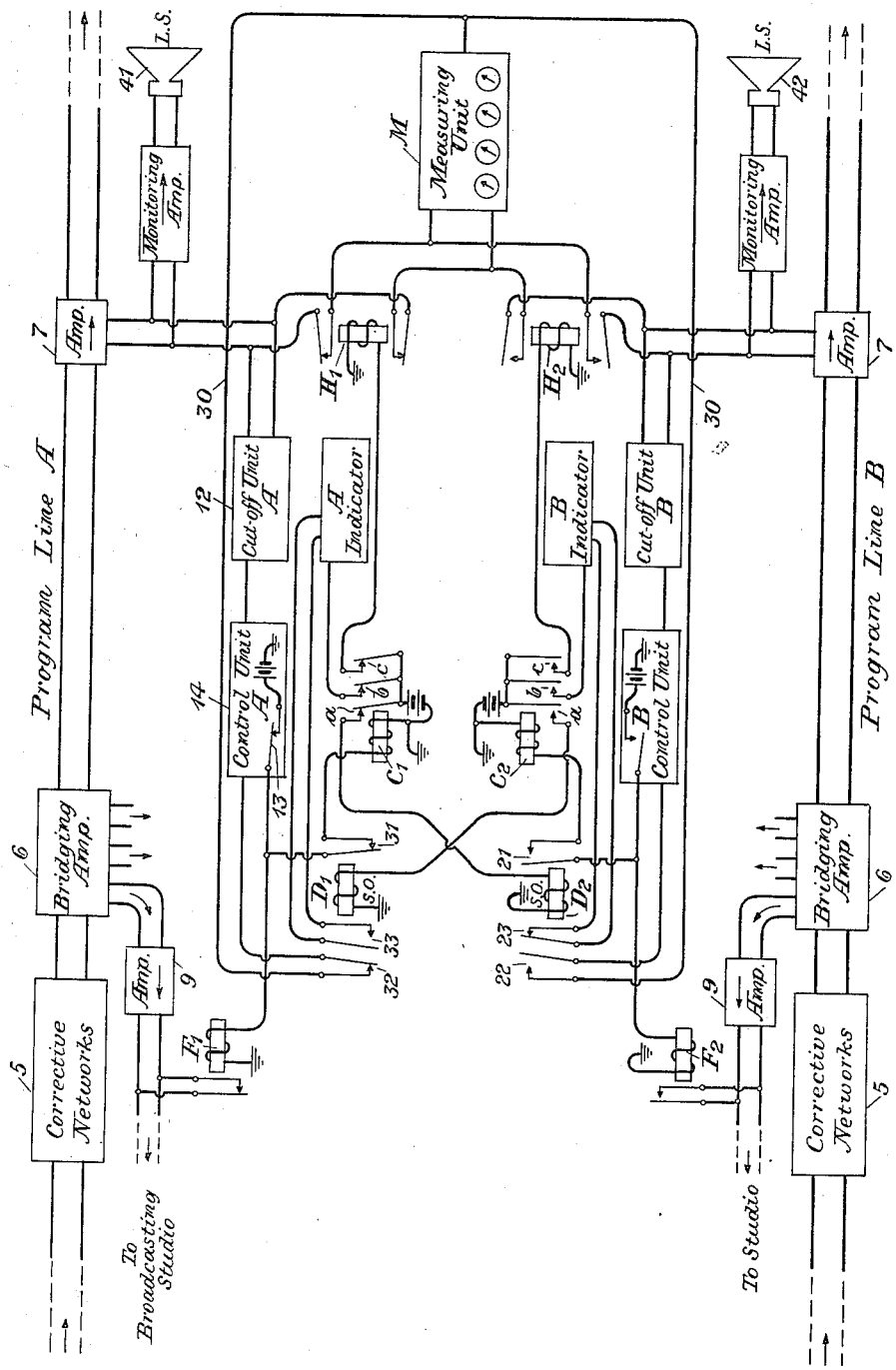

2,067,320

UNITED STATES PATENT OFFICE 2,067,320

MEASURING SYSTEM FOR PROGRAM
CIRCUIT MAINTENANCE

Harold S. Hamilton, White Plains, N. Y., assignor to American Telephone and Telegraph Company, a corporation of New York Application October 17, 1935, Serial No. 45,497

8 Claims. (Cl. 179—175.3)

This invention relates to a system for measuring the characteristics of transmission lines, and more particularly will be illustrated in connection with measurements to be taken on so-called program circuits in which, in order to obtain best results, it is important to take measurements on the transmission characteristics of such circuits from time to time, making use of the short intervals which may be available between different parts of the program, and to do this at a plurality of typical frequencies selected in the frequency range of the program.

While the invention has application in many types of circuits, it is particularly adapted for and will be illustrated in connection with such a measuring and recording system as is described in application of Affel and Best, Serial No. 685,775, filed August 18, 1933. With such a system as described in that application the equipment for making and recording the measurements are quite extensive, and in the event that there are several circuits coming to one point, such as a repeater point, at which measurements are to be taken, it is desirable to economize on the apparatus by using one measuring and recording unit for a number of circuits, provisions being made by which the measuring unit may be connected to one or another of the circuits on which measurements are to be made.

The purpose of the invention is to provide switching mechanism by which any one circuit under test will select the measuring unit and hold it in operation for the necessary time and then release it. Another purpose is to do this in a manner which will prevent the operator on one circuit from seizing control of the measuring unit while it is connected to another circuit and at the same time to disable the derived circuits running to broadcast studios so that the measuring currents will not be transmitted to those studios.

The invention will be better understood from the following specification and the accompanying drawing, in which the figure shows in detail the various elements necessary for carrying out this invention and one way of associating these.

On such program circuits, which may be quite long, there will be a plurality of repeaters from point to point and at certain of these repeater points it will be desirable to learn the exact characteristics of the line of the program circuit at any moment. Two such circuits, designated Program Line A and Program Line B are shown in the figure with transmission on each of these shown as going from left to right, and the equipment of the figure is that appropriate for a selected repeater point. The program coming in on the line A will in general pass through a corrective network 5 and a bridging amplifier 6 and line amplifier 7, continuing then on the transmission line to the right. A plurality of derived circuits from the bridging amplifier will go to other program circuits and to the various studios from which the program is to be broadcast and, in general, each derived circuit going to a studio will include an amplifier 9. At a remote point on the line A, such as a preceding circuit control point or the program source point, there will be associated during the measuring interval a sending unit consisting of a combination of oscillators and associated clockwork mechanism so as to send out certain specified frequencies in a particular order for specified lengths of time. At the measuring point, such as that shown in the figure, there will be associated during this interval a measuring unit M comprising amplifiers, associated filter circuits, indicating meters, and control apparatus. This device records the amount of testing current of the specified frequencies received from the program line, thereby indicating its transmission condition. These units may, for the purpose of describing this invention be those shown in the application referred to above, or their substantial equivalent. The measuring unit in general will represent quite an extensive amount of equipment which is in use on any one program circuit for a short time only, and in accordance with this invention means are to be provided by which one measuring unit M may be connected with one or another of the program circuits. To this end a third unit is provided consisting of a cut-off device and associated apparatus, which functions either alone or in conjunction with the measuring unit and includes means for preventing the testing currents from being transmitted to the broadcasting station, and hence, out on the air where they may cause annoyance to the listeners.

For a description of the functioning of the circuit arrangements of the figure, let us assume that a starting signal is sent out from the sending station connected to the line A. This starting signal may be of any suitable form to initiate operation of the cut-off unit 12, with which there is associated clockwork mechanism of a form to operate in synchronism with similar clockwork mechanism at the sending station. As an illustration of the starting signal which is appropriate, we may take a single frequency, or preferably, two frequencies of, say, 100 cycles and 4,500 cycles, these being chosen as lying within the signaling band of frequencies and yet of frequencies which are not especially annoying to the listeners if a small amount of it should go to the broadcast studio before the operation of certain circuits. These frequencies may also conveniently be two of those which are used for testing purposes. This starting signal may come over a circuit derived from the amplifier 7 and will be intercepted by the cut-off unit A, which thereupon closes a contact 13 in the control unit 14 and this in turn operates relay $F_1$ to short-circuit or otherwise temporarily disable the pair of conductors going to the broadcast studio from the amplifier 9 as well as corresponding units for other circuits going to other broadcast studios. The operation of the relay $F_1$ prevents the testing current which follows the starting signal from being transmitted to the broadcast station. Relay $C_1$ is also operated through the closing of contact 13, provided relay $D_1$ is non-operated. Through contact $a$ of relay $C_1$ relay $D_2$ is operated to open the circuit of relay $C_2$ at contact 21, thus preventing the control unit B from gaining control of the measuring unit in case a signal is applied to the program line B before the measurement on the line A is completed. Relay $D_2$ also disconnects the control unit of circuit B from the measuring unit by opening contact 22. It also functions to close contact 23, extinguishing a signal on indicator B, in case one had been displayed there. Through contact $c$ of relay $C_1$, relay $H_1$ is operated, connecting the measuring unit M to the line A. The closing of contact $b$ of relay $C_1$ causes a signal to be displayed on indicator A. This latter is a locking signal and indicates that the measuring unit is recording or has recorded a measurement on line A, and this signal remains displayed so that when the attendant comes to observe the reading of the measuring unit, he will know on what circuit the measuring unit was last connected. The necessary control features for unlocking and locking the meters of the measuring unit, as described in the copending application, may be obtained over circuit 30 through the control unit A when the device is functioning on program line A, this control circuit being established through the contact 32 when the relay $D_1$ is non-operated, as is the case when testing current is coming over the program line A.

By the circuit arrangement as thus far described it is clear that the starting signal coming in over line A, followed by the testing currents, will short-circuit the lines to the broadcasting studios served by the line A, will associate the measuring unit with the line A, and will disable the equipment to be used in the event of starting signal coming over the program line B.

Upon the completion of the sequence of testing currents on the line A the contact at 13 will be opened and the various relays will be released, freeing the measuring unit for the next program circuit on which measurements are initiated.

The functioning of the circuits when a signal is applied to line B may be readily traced through the various relay circuits in a manner identical with that described for program line A, and no further description thereof is therefore necessary. It should be added, however, that in order that there shall be no interference between signals on the two circuits in case a signal is applied to line B a fraction of a second after the completion of the measurements on line A, it is desirable that the relay $H_1$ shall be released before relay $H_2$ can operate, and vice versa. This is provided for by giving a certain hangover to the relays $D_1$ and $D_2$, i. e., making them slow-release relays, so that relay $H_1$ will be released before $D_2$ lets go and relay $H_2$ will be released before relay $D_1$ lets go.

It is, of course, desirable that supplementary to the equipment as thus far described, there shall be suitable monitoring devices associated with each program circuit. Such monitoring devices in the form of loud speakers 41 and 42 are shown although it is to be understood that these are purely supplementary and do not enter directly into the functioning of the remainder of the circuit as described.

Although the invention has been described in connection with two program lines, it is to be understood that the circuit arrangements may be extended indefinitely to serve as many program lines as may be desired. It will also be apparent that many variations may be made over the specific circuit arrangements shown, without departing from the spirit of the invention.

What is claimed is:

1. In an electric circuital system comprising a plurality of separate electric circuits all centering at one common point, means for separately measuring and recording electrical characteristics of any one of the separate circuits at desired times at a plurality of frequencies, comprising a generator of the plurality of frequencies at remote points and a recording device at the common point, means for sending a starting signal from any of the remote points, the starting signal consisting of one or more of the plurality of testing frequencies, and means at the common point responsive to the starting signal for associating the recording device with the circuit over which the starting signal was transmitted.

2. In an electric circuital system comprising a plurality of separate electric circuits all centering at one common point, means for separately measuring and recording electrical characteristics of any one of the separate circuits at desired times at a plurality of frequencies, comprising a generator of the plurality of frequencies for each circuit at remote points and a recording device at the common point, means for sending a starting signal from any of the remote points, and means at the common point responsive to the starting signal for associating the recording device with the circuit over which the starting signal was transmitted and for locking out all the other circuits from the recording device during the time interval necessary for the operation of the recording device.

3. In an electric circuital system comprising a plurality of separate electric circuits all centering at one common point, means for separately measuring and recording electrical characteristics of any one of the separate circuits at desired times at a plurality of frequencies, comprising a generator of the plurality of frequencies at remote points and a recording device at the common point, means for sending a starting signal from any of the remote points, and means at the common point responsive to the starting signal for associating the recording device with the circuit over which the starting signal was transmitted, for locking out all the other circuits from the recording device, during the time interval necessary for the operation of the recording device and for releasing the measuring device on completion of the test.

4. In an electric circuital system comprising a plurality of separate electric circuits all centering at one common point, means for separately measuring and recording electrical characteristics of any one of the separate circuits at desired times at a plurality of frequencies, comprising a generator of the plurality of frequencies at remote points and a recording device at the common point, means for sending a starting signal from any of the remote points, and means at the common point responsive to the starting signal for associating the recording device with the circuit over which the starting signal was transmitted, the measuring device being taken by the first line over which starting signal arrives when the measuring device is disconnected.

5. In a program circuit system comprising a plurality of program transmission lines each adapted to supply program to a plurality of broadcasting stations, said lines all centering at a common point, means for separately measuring and recording the electrical characteristics of any one of the separate program circuits at desired times and at a plurality of frequencies comprising a generator of the plurality of frequencies for each program transmission line at remote points and a recording device at the common point, means for sending a starting signal from any of the remote points, and means at the common point responsive to starting signal for associating the recording device with the circuit over which the starting signal was transmitted and for short-circuiting or otherwise disabling derived lines from the said program circuit to the studios.

6. In a program circuit system comprising a plurality of program transmission lines each adapted to supply program to a plurality of broadcasting stations, said lines all centering at a common point, means for separately measuring and recording the electrical characteristics of any one of the separate program circuits at desired times and at a plurality of frequencies comprising a generator of the plurality of frequencies at remote points and a recording device at the common point, means for sending a starting signal from any of the remote points, and means at the common point responsive to starting signal for associating the recording device with the circuit over which the starting signal was transmitted and for short-circuiting all derived lines from the said program circuit to the studios and for locking out from the recording device all the other program transmission lines during the time interval necessary for the operation of the recording device.

7. In an electric circuital system comprising a plurality of separate electric circuits all centering at one common point, means for separately measuring and recording electrical characteristics of any one of the separate circuits at desired times at a plurality of frequencies, comprising a generator of the plurality of frequencies at remote points and a recording device at the common point, means for sending a starting signal from any of the remote points, and means at the common point responsive to the starting signal for associating the recording device with the circuit over which the starting signal was transmitted and for releasing it when measurement is completed.

8. In an electric circuital system comprising a plurality of separate electric circuits all centering at one common point and connected for normal useful functioning, means for separately measuring and recording electrical characteristics of any one of the separate circuits at desired times at a plurality of frequencies, comprising a generator of the plurality of frequencies at remote points and a recording device at the common point, means for sending a starting signal from any of the remote points, and means at the common point responsive to the starting signal for associating the recording device with the circuit over which the starting signal was transmitted.

HAROLD S. HAMILTON.